Dec. 8, 1964

J. C. MUNSON 3,160,849

AUTOMATIC TARGET SIGNAL TRACKER

Filed July 26, 1961

INVENTOR.
JOHN C. MUNSON

BY *W. O. Quesenberry*
*D. E. Hodges*

ATTYS.

Dec. 8, 1964   J. C. MUNSON   3,160,849
AUTOMATIC TARGET SIGNAL TRACKER
Filed July 26, 1961   5 Sheets-Sheet 2
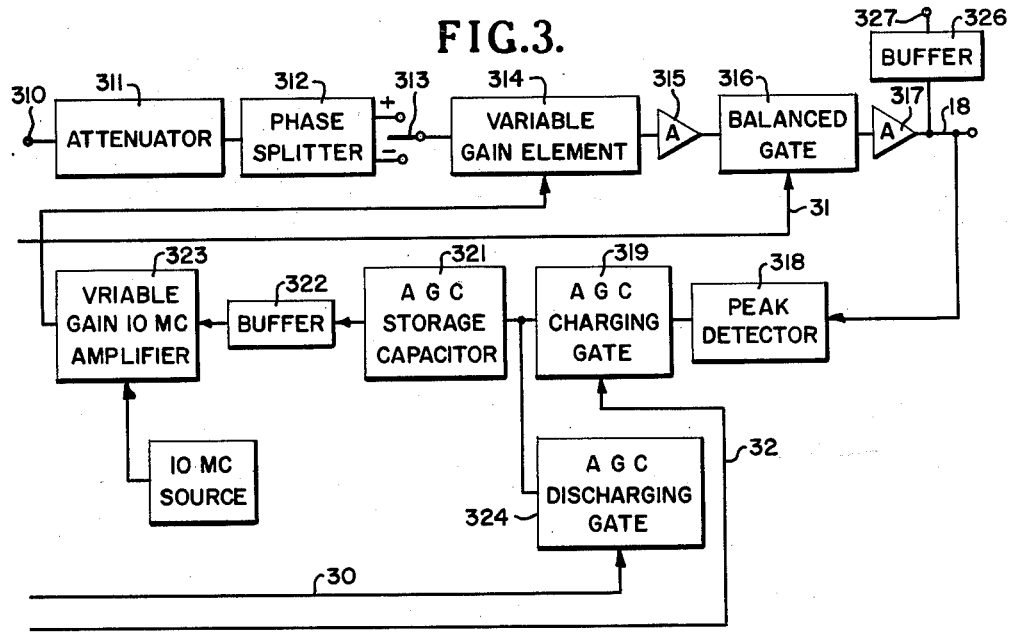
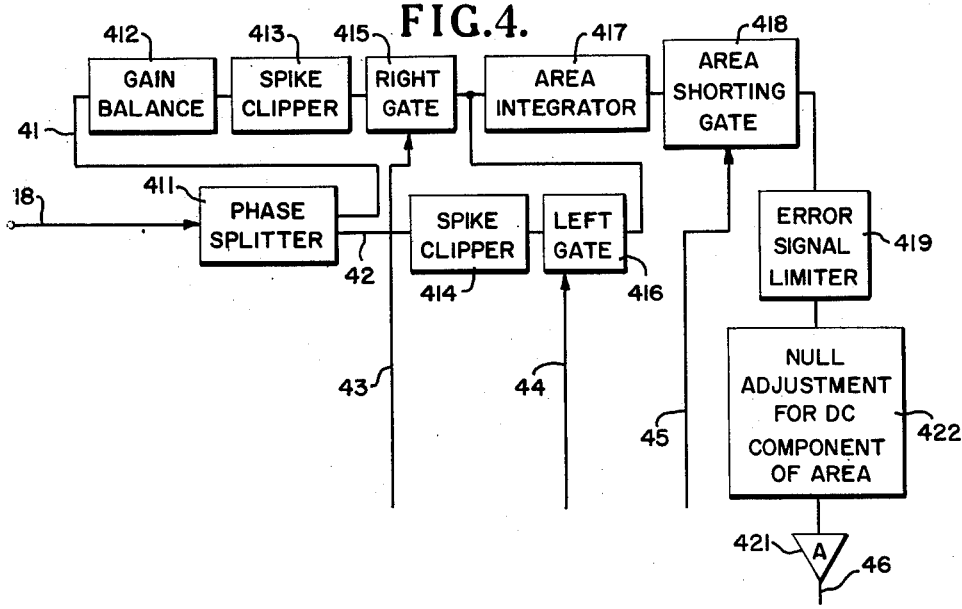
*INVENTOR.*
JOHN C. MUNSON
BY
ATTYS.

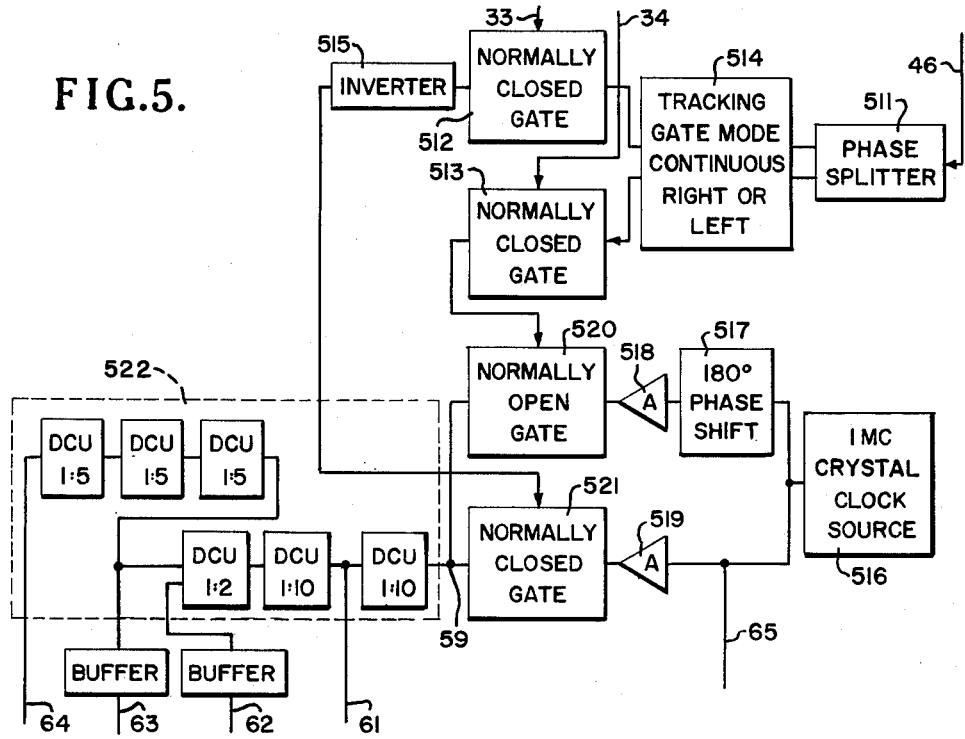
FIG.5.
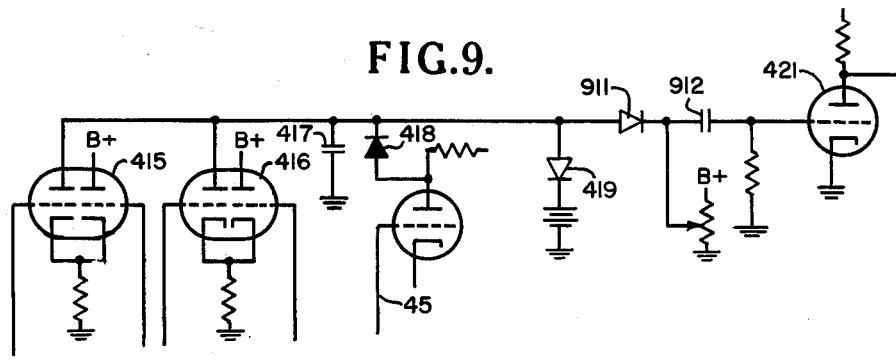
FIG.9.
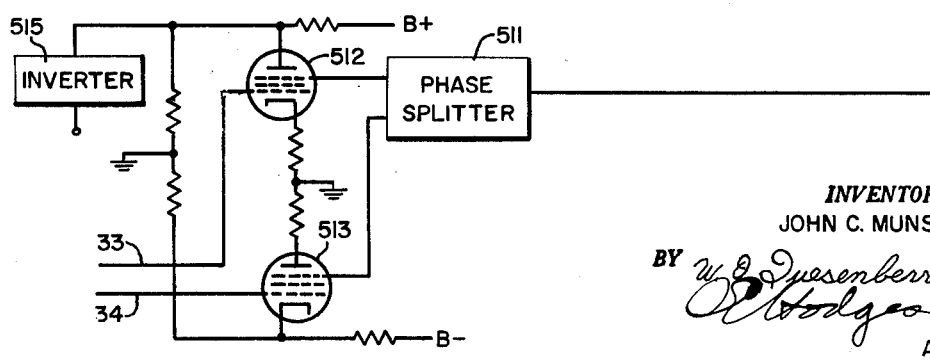
INVENTOR.
JOHN C. MUNSON
ATTYS.

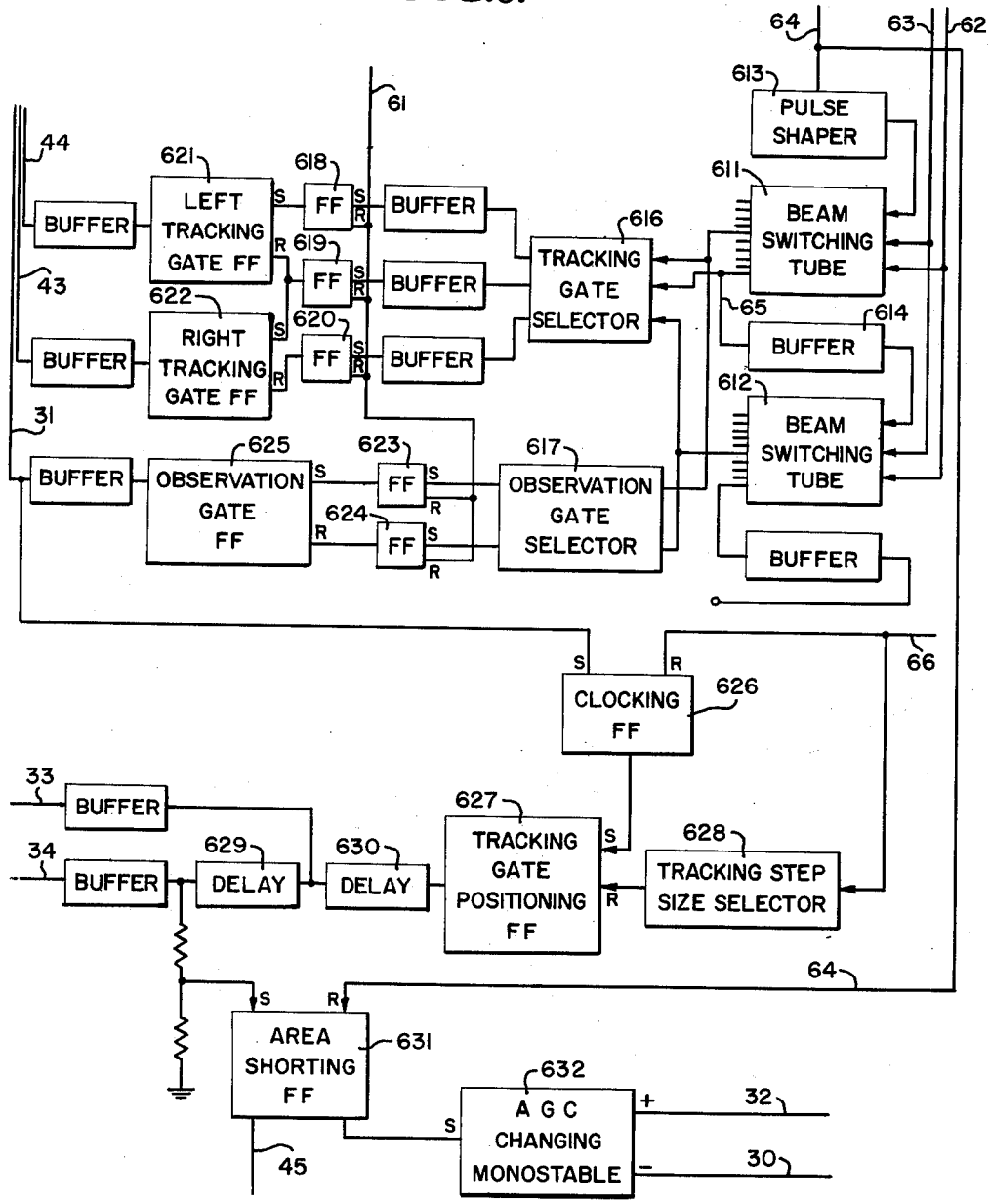

Dec. 8, 1964   J. C. MUNSON   3,160,849
AUTOMATIC TARGET SIGNAL TRACKER
Filed July 26, 1961   5 Sheets-Sheet 5
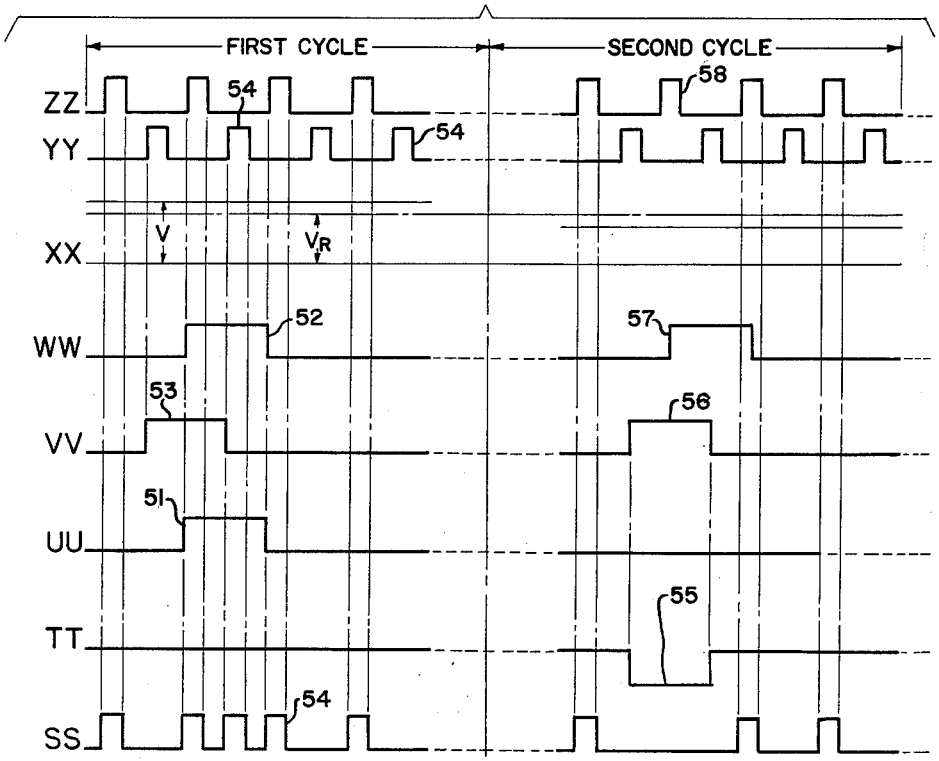
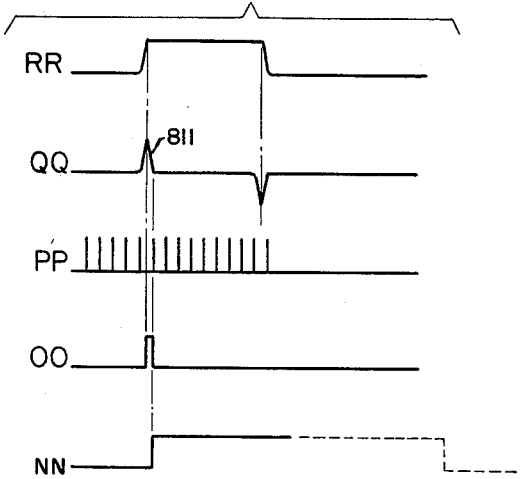
INVENTOR.
JOHN C. MUNSON
BY
ATTYS.

United States Patent Office 3,160,849
Patented Dec. 8, 1964

3,160,849
AUTOMATIC TARGET SIGNAL TRACKER
John C. Munson, Silver Spring, Md., assignor to the United States of America as represented by the Secretary of the Navy
Filed July 26, 1961, Ser. No. 127,068
15 Claims. (Cl. 340—6)
(Granted under Title 35, U.S. Code (1952), sec. 266)

The invention described herein may be manufactured and used by or for the Government of the United States of America for governmental purposes without the payment of any royalties thereon or therefor.

This invention relates to a target signal tracker, and more particularly to a target signal tracker for maintaining a gate in substantial coincidence with a target signal which exists in a heavy noise background, such as is encountered in a passive underwater detection system. This invention more particularly relates to the automatic tracking of target signals in continuously scanning systems as are utilized in a passive underwater detection system.

The passive underwater detection system utilizes a method of obtaining bearing to a sound source passively by acoustic means. Basically, hydrophones are placed in a line along the fore-aft axis of a platform, such as a submarine, spaced and separated as widely away from each other as the platform will allow. A particular acoustic wave impinges upon the two hydrophones at different times depending upon the bearing of the acoustic source. The output of the one hydrophone $h_1$ is correlated with the output of the other hydrophone $h_2$; this means that the output of one hydrophone is shifted in time to agree with the time sequence of the output from the other hydrophone. Maximum output is obtained from the correlator when proper delay (or advance) is inserted into the output of $h_1$ so that $h_1$ and $h_2$ effectively are the same distance from the target. The bearing of the target relative to the center of the line joining $h_1$ and $h_2$ is $\theta_{12}$ and is determined by this delay ($T_{12}$). With the determination of the delay $T_{12}$ and the use of other known quantities, the bearing to the target sound source may be determined by the following equation:

$$\theta_{12} = \sin^{-1}\frac{\nu T_{12}}{1} \qquad (1)$$

where $\nu$ equals the velocity of sound in water at the hydrophones and $1$ equals the separation between hydrophones. Any self-consistent set of units may be used for this computation. Thus, the bearing of the target is uniquely specified by $T_{12}$, the hydrophone separation, and the velocity of sound in water.

In order to conserve information and to obtain the maximum processing system gain, it is necessary for this system to process all of the data for a number of delays (or advances) of $h_1$ relative to $h_2$. In this manner, the correlation can be obtained for a number of delays, and the maximum of the correlation function selected while still processing all of the data for each of these delays. This is accomplished by processing each bit of data $n$ times, once for each of $n$ delay steps at a rate $n$ times as fast as the bit rate of the information out of the hydrophones. This operation is performed by a special purpose digital computer, which samples the polarity of each of the hydrophone outputs at regular intervals, stores these samples in a circulating memory, and then determines the percent agreements in polarity of the stored samples for each of $n$ delay steps. The slight loss in detection threshold incurred by using polarity coincidence correlation rather than amplitude correlation is accepted in order to greatly simplify the instrumentation of the system. The output of the correlator versus time forms a plot of correlation versus delay where the delay is in real time. When all of the delay steps have been processed, the digital computer begins processing again with zero delay. The output from the correlator is a cycle of constant repetition rate corresponding to the time necessary to process the information for each of the $n$ delay steps; a distinctive target signal is produced in the area of maximum correlation in the cycle.

Because of the great amount of noise encountered in the hydrophone outputs, which will also produce similar amounts of noise signal in the correlator outputs, it is necessary to integrate successive outputs of the correlator over fairly long integration times if the signal is to be used for visual display as in past systems. The random noise, which will not be the same each time cycle of the correlator output, tends to be cancelled over successive integrations; whereas the target signal (the point of maximum correlation) will appear at approximately the same point in the cycle each time so that the successive cycles are additive.

In the past the output signals from the integration of the correlator output were connected to an oscilloscope channel. A human operator then introduced an appropriate delay into a tracking gate generator so that the point of maximum correlation in each cycle was brought into substantial alignment with the tracking gate. The amount of tracking gate delay necessary was a direct measure of the quantity $T_{12}$. Thus, the bearing to the target sound source was normally obtained by measuring the quantity $T_{12}$ as accurately as possible by action of the human operator. The quantity $T_{12}$ is in most cases very small in comparison with the total output cycle from the correlator. To obtain a practical degree of accuracy in the measurement of the bearing, this quantity must be determined with utmost accuracy. To obtain the necessary accuracy, great care and constant attention of the human operator was demanded; this resulted in greater operator fatigue and a corresponding deterioration of the accuracy due to his fatigue.

An object of this invention is to provide an automatic target tracker which will automatically follow the correlation signal from the correlator output thereby minimizing many of the problems connected with the human operator.

It is a further object of this invention to provide a signal tracker capable of continuously tracking and determining very small time changes in the position of a target signal in a relatively long cycle with a heavy noise background.

The high noise level attending the signal received at the hydrophones of this system produces a random movement of the correlator output. This random movement presents various problems in attempting to track the correlation signal. The tracker must be able to follow changes in the true target signal position regardless of the random changes in observed target position due to the high noise level. This invention contemplates the basic solution to these problems by generating an error signal to change the gate position, using the gate to determine the position of the signal in relation to the gate, generating a gate position correction which depends only upon whether the signal position leads or lags the gate position and is independent of the amount of that lead or lag, and making a very large number of very small corrections within a given time interval. Accuracy and stability of gate widths and positions is insured by using a digital countdown from a crystal clock oscillator.

Other objects and advantages will be apparent from the following description of a preferred embodiment of the invention, and the novel features will be particularly pointed out hereinafter in connection with the appended claims.

In the accompanying drawings:

FIG. 3 is a detailed block diagram of the amplitude standardization and observation gate circuit of FIG. 1;

FIG. 4 is a detailed block diagram illustration of the tracking gate position error detection circuit of FIG. 1;

FIG. 5 is a detailed block diagram illustration of the tracking gate positioning circuit of FIG. 1;

FIG. 6 is a detailed block diagram illustration of the gating and control circuit of FIG. 1;

FIG. 7 is an illustration of various waveforms appearing at certain points in the circuit of FIG. 5;

FIG. 8 illustrates various wave shapes appearing at certain points in the circuit of FIG. 6; and FIG. 9 is a detailed illustration of a portion of the circuit of the invention relating to FIGS. 4 and 5.

Figure 1:
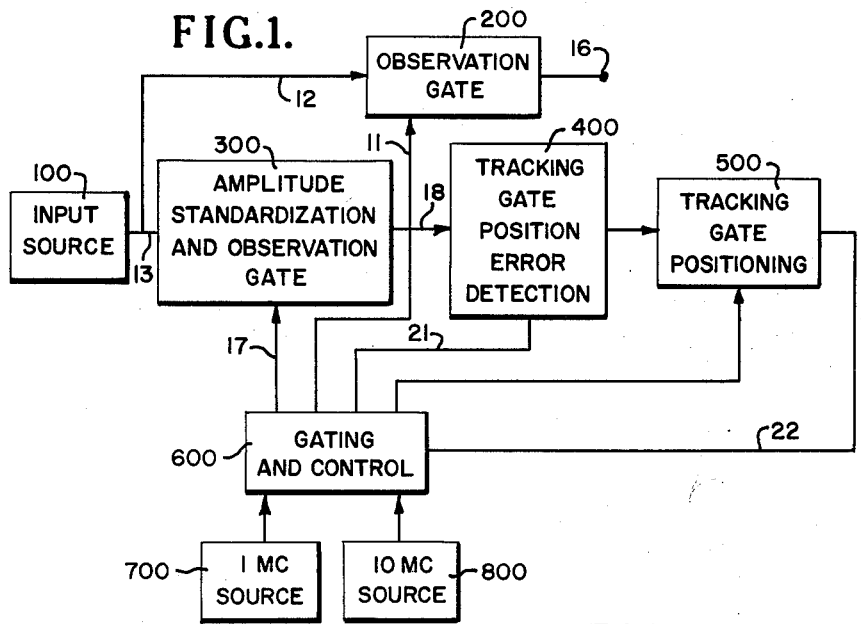
FIG. 1 is a block diagram illustrating the general principle of the invention.
Figure 2:
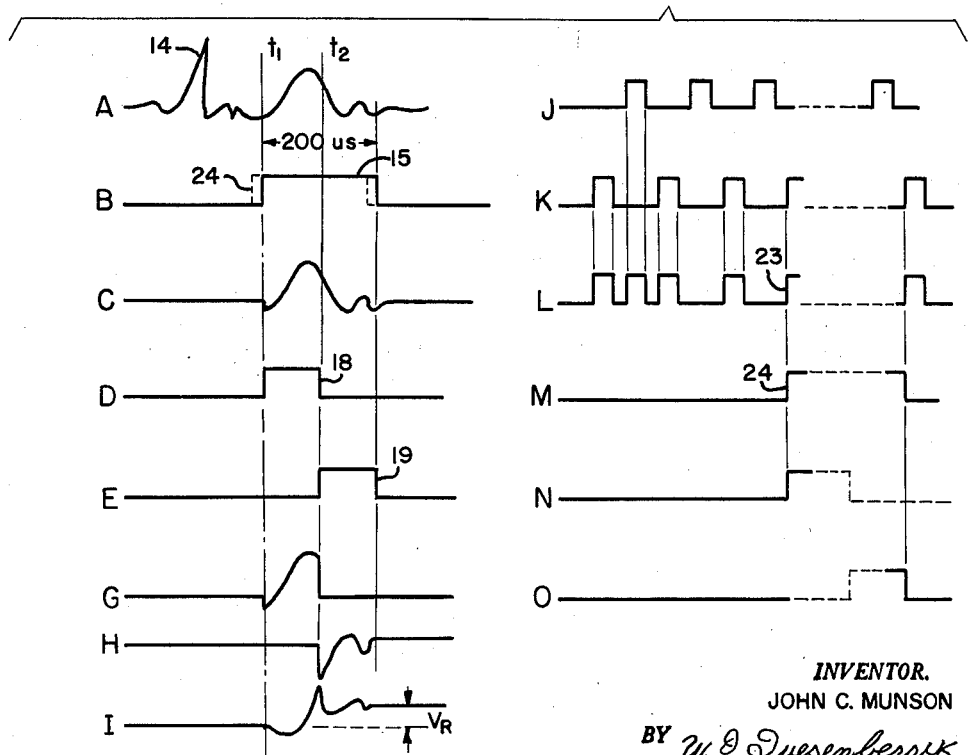
FIG. 2 illustrates various waveforms obtaining at various points in the operation of the circuit of FIG. 1.

Referring now to FIG. 1, which illustrates the main components of the invention in block diagram form, an input source 100 supplies an input with discrete cycles therein, the beginning of each cycle occurring at regularly recurring intervals (which in the passive underwater detection system would correspond to the cycles of the correlator output). The desired portion of the cycle from the source 100 containing the target signal occurs during a small portion of the entire cycle; therefore, it is desirable to use some form of gating means whereby the system need only handle that portion of the entire cycle. Thus, the input from source 100 is applied to observation gate 200 and to the amplitude standardization and observation gate circuit 300 through the data paths 12 and 13 respectively. The observation gate of circuit 200 comprises a normally closed gate to which an appropriate gating signal is applied from the gating and control source 600 through lead 11 to allow passage of only the desired portion of the cycle. The operation of the observation gate 200 may be more clearly understood by reference to the FIG. 2, waveforms A, B and C. Wave shape A of FIG. 2 illustrates the raw input from input source 100. The large peak 14 illustrates an irregularity in the input such as may be caused by noise. The desired portion $t_1$ and $t_2$ is the only portion necessary or desirable for the proper operation of this invention. Therefore, a gating pulse 15, as illustrated in waveform B, is applied from the gating and control source 600 along lead 11. The gating pulse 15 opens the observation gate 200 and maintains the gate in its open position for the duration of this pulse thereby allowing passage of the cycle only in the vicinity of the desired portion thereof, as is shown by waveform C of FIG. 2. The output appearing at terminal 16 is simply intermittent occurrence of the target signal to be tracked and may be useful for observation of the signal or auxiliary functions. This observation gate 200 is not necessary to the operation of the tracker.

The amplitude standardization and observation gate circuit 300 operates in a similar manner to the operation of the observation gate 200. Besides gating the input, the circuit 300 also contains an automatic gain control circuit to standardize the amplitude of the gated portion of the cycle. This amplitude control produces as large a signal as possible without the chance of overloading any of the subsequent D.C. circuitry. A gating pulse is applied from the gating and control circuit 600 through lead 17 to accomplish isolation of the aforementioned desired portion of the cycle. The gated and standardized signal from circuit 300 is applied through the tracking gate position error detection circuit. A pair of gating pulses 18 and 19 of equal time duration, as shown by the waveforms D and E of FIG. 2, are generated by the gating and control circuit 600 and applied through the path 21 to a pair of gates within the circuit 400. The left half gating pulse abuts the right half gating pulse 19 in time, such as to define equal time periods on left and right sides of the center of the observation gate pulse 15. The left and right half gating pulses need not abut one another; they may be placed at equal distances from the center of the observation gate pulse, if desired. The total time of the two half gate pulses 18 and 19 may be equal to that of pulse 15, but width of the observation gate pulse 15 is usually made larger than the sum of the two half gate pulses 18 and 19. The gate pulses 18 and 19 are applied to a pair of normally closed gates to open these gates for the duration of the pulse to allow the passage of the signal therethrough. As shown by waveforms G and H, the output of the right half gate is inverted with respect to the output of the left half gate. The output of the left half and right half gates are applied to a common integrating device to compare the total area under the signal appearing in each half. If the gate signals are exactly positioned at the center of the signal, the areas under the two halfs of the gated signal will be equal; the charge upon the integrator will be increased during the period of the left half gate and an equal amount of charge will be subtracted from the integrator during the period of the left half gate thereby leaving the integrator with its reference charge at the end of the cycle. However, if the gate pulses are off center with relation to the signal, unequal amounts will be added and subtracted from the integrator during the right and left half periods, as is illustrated in FIG. 2, thereby causing a change in the charge on the integrator from the reference at the end of the gate cycle. This change from the reference charge is an indication of the direction in which the gate must be moved to center it on the desired portion of the cycle. This may be referred to as the error detection signal.

The tracking gate positioning circuit 500 contains a counting chain responsive to a 1 megacycle or other high frequency source of pulses and having a count capacity equal to the signal repetition rate of the input signal. The 1 megacycle source (as illustrated by waveform K of FIG. 2) is applied through a normally open gate to the counting chain; a second 1 megacycle source 180° out-of-phase with the first (as illustrated by the waveform J of FIG. 2) is also applied to the counting chain. Depending upon the polarity of the error signal from the circuit 400, a pulse is either dropped by closing the normally opened gate on the first 1 megacycle source for a period of one pulse or a pulse is added to the counting chain by opening the normally closed gate for the second 1 megacycle source thereby inserting an extra pulse between two of the pulses from the first source, as is illustrated by waveform L. Thus, on each count cycle of operation a pulse may be either added to advance the counting chain or dropped to retard the counting chain by a single digit. If a pulse is inserted, the counting chain reaches a particular count sooner in the input cycle; whereas if a pulse is dropped the counting chain reaches the same count later in the cycle. The path 22 corresponds to pulses derived from the counting chain as the count reaches a certain amount during any particular count cycle. These count pulses are applied to various gate pulse producing elements within the gating and control circuit 600 to produce the aforementioned gates, as illustrated by the waveforms M, N and O corresponding to the aforementioned gate waveforms B, D and E, respectively. A particular pulse 23 equal to a predetermined number count in the counting chain generates an observation gate pulse 24; since one count has been added the predetermined count is reached earlier in time and thus the observation gate pulse (as is each of the other gate pulses) is moved to the left in relation to the preceding gate pulse, as illustrated by the dotted line 24 in waveform B. A 10 megacycle source 800 is applied by the circuit 600 and used to control the operation of the automatic gain control of circuit 300, as will be described in the more detailed description to follow.

It is important at this time to consider the problem of developing a target tracker for a moving target signal in a heavy noise background.

The electronic circuitry of the tracker compares the position of the gates with the instantaneous position of the target signal. Since noise is present in each cycle, random displacements and variations of amplitude will occur in the target signal; hence, the apparent position of the target signal will not necessarily correspond to the true position of the target signal. In the past, target trackers have corrected the gate position by amounts proportional to the amplitude of the error signal developed from comparing the gate position with the target signal position. However, the use of such a proportional system would be less effective in a heavy noise background as encountered in underwater acoustics where the signal to noise ratio is not stationary since the noise produced variations or absence of a target signal during any particular cycle could produce a large error signal in either direction independent of the movement of the target signal which would thereby move the tracking gate completely away from the true target signal thereby losing the target.

The basic concept of the instant invention in effect is to provide a digital type memory of the last determined position of the target signal in the cycle; thus, if during any particular cycle the target signal is absent or obscured by noise, the tracking gate is returned to the vicinity of the target signal during subsequent cycles in spite of one or a number of wrong step movements of the gate. A proportional type system may be designed with a digital gate position memory; however, the average step size for the gate movements must be controlled to be approximately the same size as the fixed gate step size, as later defined. However, such a proportional system has two distinct disadvantages. First, a proportional type system of this type would require much additional complex circuitry over the instant circuit. Second, such a system would only provide a better operation in the presence of certain types of heavy noise backgrounds, such as Gaussian type noise. The basic weakness of such a system would be its tendency to make the largest decisions on the least information (i.e. large step movements due to heavy noise obscuring the target signal); this basic weakness decreases the usefulness of proportional systems with heavy underwater acoustics (as distinguished from Gaussian type) noise backgrounds.

Another advantage found in the use of the fixed step size over the use of the proportional type system is the increase in effective integration time with decreasing signal-to-noise ratio for the fixed step size tracker. In a proportional system the integration time remains fixed as the signal-to-noise ratio changes, and so the gate has a very large random movement during the pjeriod when the signal is obscured by heavy noise. Thus, the accuracy with which the bearing to the target can be determined is greatly reduced under periods of heavy noise. In the fixed step size tracker, however, the noise cannot introduce such large excursions since the same size step is taken regardless of the amount of error signal, although for high signal-to-noise ratios the tracker locks onto the target motion very well since then nearly all of the decisions are made correctly. Thus, the effective change in integration time due to the nonlinear action of the fixed step size tracker has a salutory effect in tracking targets whose signal-to-noise ratios are not constant.

This invention, however, makes a decision on the basis of the position of the apparent target signal to the position of the gate only as to whether the target signal position is changing to the right or to the left. The gate position has been altered by a fixed amount (step) to the right or to the left, this decision being independent of the amplitude of the error signal. For large noise-to-signal ratios the information on target signal motion per observation is small and only in a probability sense is it possible to say that the observation is in agreement with the true target signal motion. The size of the step for gate movement should be compatible with the amount of information, and this implies a small step but a large number of steps per unit time.

With no noise a tracker is able to follow a target signal movement of $nL$ microseconds per second, where $n$ is the number of steps and $L$ is the size of each step. When used in the aforementioned passive underwater detection system, the delay steps must be small due to the large amount of noise encountered. Steps taken in the direction of target signal movement must occur with a probability greater than one half in order that the average rate with which the gate moves equals the rate at which the target signal moves. Thus, if the target signal movement is less than $nL$ microseconds per second, then some steps will be taken in the opposite direction of movement.

The tracker must lag the true target signal due to the errors caused by noise. This lag will depend upon the rate of movement of the target signal, the signal-to-noise ratio, and the step size. A mathematical analysis of the system reveals that the maixmum average target signal motion that the tracker is able to follow is given by the expression $nL\sqrt{2WT} \cdot S/N$ where L designates the step size, $n$ designates the number of decisions made per second, W designates the band width of the system, and $S/N$ equals the signal-to-noise ratio of the incoming signal. Using this expression, a system may be designed having necessary parameters to track a given signal.

Now, turning to the details of the circuit, FIG. 3 shows the elements contained in the amplitude standardization and observation gate 300. The input is applied to input terminal 310 and is attenuated to a proper level by the attenuator circuit 311, which is set at a particular level by the operator so that signals of varying strength may be handled. The attenuator output is then applied to the phase splitter 312. The output then appears at the two outputs of the phase splitter 312 in opposite polarities. A mechanical switch 313 is provided so that one polarity or the other may be used in representing the signal. The switch is necessary because the system will only track a single polarity signal. Thus, a negative target signal may be converted into a positive signal that the system will track. The signal is then applied to a variable gain element 314, which constitutes the controlled element of a gain control circuit. The particular variable gain circuit used in this instance is unnecessary to a practice of the invention and is the subject of a further application. The gain control circuit becomes unnecessary where the target signal is fairly well standardized in amplitude on successive occurrences; however, gain control becomes necessary or highly desirable in heavy noise backgrounds or when substantial variations in the amplitude of the target signal appear. The output is then applied to the amplifier 315 and thence to the balanced gate 316. The balanced gate 316 is a normally closed gate which is opened by an observation gating pulse applied through lead 31 for a period of time in the vicinity of the occurrence of the target signal. The remainder of the output cycle is prevented from passing through this gate by the absence of a gating pulse on line 31 during that period. The operation of the balanced gate is more fully understood by reference to FIG. 2, waveforms A, B and C, in which A represents a portion of the input cycle to the gate from the amplifier 315; waveform B represents the gating pulse applied to the balanced gate on lead 31; and waveform C represents the output of the balanced gate. Spurious signals caused by noise in other portions of the signal are thereby eliminated from the system. The gated signal is then further amplified by the amplifier 317 and appears on the lead 18, and a portion of the signal appearing on lead 18 is fed back to the variable gain element 314 to control the gain in the following manner. The signal is first applied to peak detector 318 which comprises a circuit such as an integrating capacitor-resistance network with a high time constant which develops a voltage corresponding to the peak amplitude of the applied signal, such voltage then slowly decreasing. The voltage on the peak detector is next applied through the AGC charging gate 319, which comprises a normally closed gate that is opened by a gating pulse on the lead 32; the gating pulse on lead 32 is coextensive with a gating pulse appearing on line 30, the pulses appearing immediately after the gate pulse on 31. The voltage of the peak detector is then used to charge the AGC storage capacitor 321 for the short period of gate pulse on 32. The voltage on the storage capacitor 321 after the charging is applied through buffer 322 to the variable gain 10 megacycle amplifier 323. The AGC discharging gate 324 provides a means by which a fixed amount of charge is discharged from the AGC storage capacitor 321 at the same time that a charge proportional to the difference between the voltage on the peak detector 318 and a reference voltage is being supplied through the charging gate 319; the voltage discharged is sufficient to discharge from the capacitor 321 a sufficient charge to be able to detect any decreases in voltage from the previous cycle. The voltage from the remaining charge on storage capacitor 321 is used to vary the bias on a 10 megacycle pentode amplifier such that the output of the amplifier 323 is decreased with increases in the voltage on 321. The output from the amplifier 323 is used to control the variable gain element 314, which consists of a pair of diodes oppositely disposed and connected in parallel. With the automatic gain control circuit in operation, a standardized amplitude gated signal appears on lead 18. A portion of this output is also taken off through buffer 326 and applied to terminal 327. The terminal 327 is provided simply as a tap to study the operation of the amplitude standardization and observation gate circuit 300.

The gated standardization signal is then applied to the tracking gate position error detection circuit 400, which is illustrated in detail in FIG. 4. The signal is first applied to the phase splitter 411 thus obtaining the signal as two opposite polarities on the leads 41 and 42. A gain balance potentiometer is provided to balance the amplitude of the signal on lead 41 with that appearing on lead 42. The spike clippers 413 and 414 simply remove any undesired large amplitude spikes relative to the signals appearing in the cycle at this point which might pass the closed gates 415 and 416. The right gate 415 and the left gate 416 are normally closed gates to which the signal is applied. Gating pulses are applied to these gates by leads 43 and 44 to first open the left gate to apply the first half of the target signal to the area integrator 417; then as the left gate becomes closed the right gate 415 is opened to apply the next half of the target signal in the opposite polarity to the area integrator 417, as previously explained in connection with FIG. 2 waveforms D, E, G and H. The integrator 417 is a common capacitive integrator, which at the end of the gate cycle contains a charge measuring the integral of the signal passing through the right gate minus the integral of the signal passing through the left gate, as illustrated in FIG. 2 waveform I.

The difference between the voltage from the charge on the area integrator and a given end reference voltage at the end of the cycle is termed the error signal. This difference may result from the end charge being either greater or lesser than the charge on the integrator at the beginning of the charge gate cycle. An area shorting gate 418 comprises a normally closed gate used to reset the area integrator at the end of each signal cycle; thus the area integrator 417 is returned to a given starting reference point before each operation of the gates; due to the D.C. character of the left and right gate outputs the starting reference will differ substantially from the end reference voltage. An error signal limiter 419 receives the error signal from the area integrator 417 and prevents the error signal from exceeding a given amount which could be damaging to other elements. The right gate 415 and the left gate 416 are simple dual triode or pentode- triode gates in which a D.C. component is inherent in the output thereof. Since this D.C. component is of appreciable amplitude, it becomes necessary to remove this D.C. component by a null adjustment element before applying the signal to the amplifier 421. The circuitry relating to the null adjustment 422 for removing the D.C. component of area is described later in detail.

The output from amplifier 421 is applied to the phase splitter element 511 of the tracking gate positioning circuit of FIG. 5. The error signal is thus converted into a positive error signal and a negative error signal to be applied to the gates 512 and 513. Interposed between the phase splitter and the gates is a tracking gate mode continuous right or left element 514. This element is simply a pair of switches by which the operator may connect either of the gates 512 or 513 to appropriate sources of D.C. potential so that the position of the tracking gate may be made to slew either right or left continuously to bring the gate originally onto a remote traget signal.

At this time, it is desirable to describe in more detail some of the aforementioned elements by reference to the detailed illustration of FIG. 9. The left gate 416 is opened first by a gate pulse; the gated signal allowed to pass therethrough contains a large D.C. component of gated through the right gate 415 to the capacitor 417; The voltage on the capacitor is originally set to a starting reference level. The voltage on the capacitor may, for example, equal as much as 250 volts because of this D.C. component. Next the negative signal to the right gate is gated through the right gate 415 to th ecapacitor 417; the voltage of the capacitor will then drop, for example, to a level around 150 volts. It will be assumed that 150 volts constitutes a reference voltage level; whether the end voltage on the area integrator 417 is above or below this reference voltage level determines whether the tracking gate is moved right or left. The end voltage is limited by the biased diode 419 so that if the end voltage is above a certain maximum, say 151 volts, it will be clamped through the diode. The null adjustment element comprises a diode 911, in series with the signal, which is biased to a voltage, for example, of 149 volts so that it will pass only voltages above that amount. Thus, the error signal applied to the amplifier 421 varies with a two volt range (from 149 to 151 volts), which is decoupled from the amplifier grid by the capacitor 912 to give a signal thereto from zero to two volts. The amplified error signal from the amplifier 421 is then applied to the phase splitter 511 so that equal signals of opposite polarity may be applied to the two pentodes 512 and 513. If the end voltage on area integrator 417 is above the reference voltage level, the gate 512 will be opened in the presence of a gating pulse on line 33 and gate 513 will remain closed; if the end voltage is below the reference voltage level the gate 513 will be opened in the presence of a gating pulse on line 34 while the gate 512 will remain closed. This circuit may be designed either to open both gates when the end voltage on the area integrator 417 is equal to the reference voltage level, or to maintain both gates closed; either will result in no movement of the gate position.

Referring again to FIG. 5, the output of the gate 512 is inverted by the inverter 515 so as to obtain a positive pulse to open output gate 521. A one megacycle crystal clock source 516 supplies high frequency pulses to the phase shifting network 517 wherein these pulses are shifted 180° and are then applied to an amplifier 518 and thence to the normally open gate 520. The one megacycle pulses are also supplied with no phase shift to an amplifier 519 and thence to the normally closed gate 521. The output of both gates are combined at terminal 59 and supplied to the decimal counting unit 522. Now FIG. 7 illustrates the operation of the tracking gate positioning circuit for both a movement of the tracking gate to the right and a movement of the tracking gate to the left. The waveform ZZ illustrates the input to the normally open gate 520 whereas waveform YY illustrates the input from the one megacycle source to the normally closed gate 521. When no gating pulses are supplied from the gates 512 and 513 the normally open gate 520 passes the inputs from the one megacycle source. Waveform XX illustrates the input to the phase splitter 511; this signal will be applied to the gates 512 and 513 in opposite polarities. The waveforms WW and VV represent the gating pulses supplied to the normally closed gates 512 and 513 respectively along lines 33 and 34, respectively. The waveforms TT and UU represent the gating pulses supplied to the gates 520 and 521 respectively from the gate 513 and the inverter 515. When the error signal V supplied by line 46 to the phase splitter 511 is above the reference level $V_R$, as shown in the first cycle of FIG. 7, a gating pulse 51 is generated by the gate 512 when another gating pulse 52 is supplied thereto; the gate 513, however, generates no gating pulse upon the application of another gating pulse 53 thereto. The gating pulse 51 is then applied to the normally closed gate 521 to allow the passage of the one megacycle pulse 54 thus adding a pulse to the normal series of pulses passing through gate 520. In the second cycle of FIG. 7, the error signal is below the reference level; this produces a gating pulse from the gate 513 when another gating pulse 56 is applied thereto and prevents the gate 512 from producing a gating pulse upon application of another gating pulse 57 thereto. The pulse 55 closes the normally open gate 520, thus excluding the one megacycle pulse 58 from the normal series. The result of the adding and dropping of the pulses is illustrated by waveform SS which shows the pulse sequence appearing at terminal 59 for both the adding operation of the first cycle and the dropping operation of the second cycle.

The pulses appearing at terminal 59 are supplied to a counting chain 522 which comprises a series of commercially available decimal counting units. The counter 522 has a total count equal to the cycle repetition rate of the input from source 109; thus if pulses are neither added nor dropped from the one megacycle pulse source the counter 522 will begin its count at the same point in each signal cycle. The leads 61 through 65 are arranged to tap the counter 522 at various places to obtain outputs from the counter of particular frequencies.

Referring now to FIG. 6, which illustrates in detail some of the circuit elements employed in the gating and control circuit, the supplementary counter circuit composed of beam switching tubes 611 and 612 each having nine output positions thus giving a total count of 18. The last count of the counting circuit 522 is applied to the pulse shaper 613 by the lead 64. The pulse shaper 613 generates an appropriate pulse on reception of the last count of the counting unit 522 to set the beam switching tube 611 into its first position of operation. Five kilocycle pulses from the leads 62 and 63, which are 180° out-of-phase with each other, are applied alternately to the beam switching tubes 611 and 612 to advance the beam in step fashion to each of the nine output positions of each tube. When nine total pulses have been received from lines 62 and 63, the beam has then reached the last position in tube 611 and an output pulse is applied to line 65 from the last output through the buffer 614 to the beam switching tube 612 to enable this tube. The pulses on lines 62 and 63 then advance the beam to each of the nine positions on tube 612 until the last position is reached. Thus a total count of 18 is derived from the beam switching tubes 611 and 612, and after the last count the two tubes are extinguished until the next signal cycle when a pulse is received on line 64.

Tracking gate selector 616 and observation gate selector 617 are shown connected to various outputs of the beam switching tubes 611 and 612. These selectors 616 and 617 comprise a series of switches by which any of the beam switching outputs may be selected for application to the subsequent circuitry. In this manner, the duration of the gates and their positions relative to the total count may be varied to suit a particular application. The connections made in the illustration of FIG. 6 would give an observation gate duration of 1000 microseconds and a tracking gate duration for each half thereof of 500 microseconds; gate sizes may be decreased by using the selector to derive each of the inputs to the subsequent circuitry from more closely adjacent outputs on the beam switching tubes. The selectors 616 and 617 also contain differentiating circuits for each of the paths to generate short duration pulses in the order of 3 to 5 microseconds in response to the leading edge of the pulse derived from the beam switching tube. Each of these pulses is applied in order through buffer stages to the flip-flops 618, 619 and 620. Each of these pulses sets its appropriate flip-flop in turn; the flip-flops are then immediately reset by the next gate pulse from the 100 kilocycle pulse train on line 61 derived from the counting unit 522. As each of the three flip-flops is reset, pulses are applied to the left and right tracking gate flip-flops 621 and 622. The output from the flip-flop 618 sets the left tracking gate flip-flop 621; the output of the flip-flop 619 then resets the left tracking gate flip-flop and sets the right tracking gate flip-flop; and the output from flip-flop 620 resets the right tracking gate flip-flop 622. The output of the tracking gate flip-flops 621 and 622 are voltage pulses the duration of which corresponds to the total period during which either the left tracking gate flip-flop or the right tracking gate flip-flop is maintained in the set position. These pulses are applied through buffer stages to the right gate and left gate 416 through lines 43 and 44. The observation gate pulse is generated in a similar manner. The flip-flops 623 and 624 are set by pulses derived from the leading edges of the outputs from the beam switching tubes. After the flip-flops 623 and 624 have been set in turn they are immediately reset by the 100 kilocycle pulses from line 61. A pulse is applied from the flip-flop 623 upon the reset thereof to set the observation gate flip-flop 625; the reset of the observation gate flip-flop 625 is then accomplished by a pulse from the flip-flop 624 upon the reset thereof. The gate pulse generated by the observation gate flip-flop 625 is applied through the buffer stage on line 31 to open the balanced gate 316 for its duration.

The pulse from the observation gate flip-flop 625 is also used to set the clocking flip-flop 626 with the trailing edge thereof. After being set, the clocking flip-flop 626 is immediately reset by a pulse from the one megacycle crystal clock source 516 applied through line 65. The output pulse derived from the clocking flip-flop 626 upon its resetting is then applied to the tracking gate positioning flip-flop 627 to place it in its set position. The tracking gate positioning flip-flop 627 is then reset by a one megacycle pulse applied from line 65 through the tracking step size selector 628. The tracking step size selector 628 comprises an arrangement of flip-flops and switches connected to a counting circuit (not shown) as described in relation to the tracking gate selector 616 and the observation gate selector 617 and their subsequent circuitry, or any appropriate delay device which delays the application of the reset pulse to the tracking gate positioning flip-flop 627 for a period of time equal to a fixed number of the megacycle pulses. This delay will determine the width of the pulse from flip-flop 627 and subsequently determine the number of pulses to be added or dropped from the count for each signal cycle. The selector 628 may be omitted when only a single pulse is to be added or dropped each cycle. The pulse from flip-flop 627 is delayed in the adjustable delay 630 a sufficient amount so that it will coincide with one of the pulses from the one megacycle source 516 applied to the normally closed gate 521. The delayed pulse is then applied through a buffer stage to the line 33 to act as a gate pulse for the normally closed gate 512. The pulse from selector 628 is further delayed in the fixed delay element 629 which will provide the 180° phase shift necessary for application to the normally open gate 520; the further delayed gating pulse from the fixed delay element is then applied through a buffer stage to the line 34 to act as a gate pulse on the normally closed gate 513. This pulse is further used to set the area shorting flip-flop 631, which is reset by a pulse on line 64 at the end of each counting cycle. The pulse occurring from the setting of the flip-flop 631 is used to set the automatic gain control changing monostable 632. After being set, the monostable 632 changes back to its original state after a given short period of time, thus producing short pulse outputs of opposite polarities on lines 32 and 30 to open the automatic gain control charging gate 319 and discharging gate 324 at the end of the observation; and then, when the monostable returns to its original state, the charging and discharging gates 319 and 324 are closed. When the area shorting flip-flop 631 is set a pulse is applied through line 45 to open the area shorting gate 418 to effect dicharge of the integrator 417; thus the integrator is discharged at the end of each counting cycle. The elements used herein and illustrated symbolically in block diagram form such as gates, buffers, flip-flops, counters, amplifiers, etc., may comprise any well known circuit of these types currently available in the art. The elements need only be capable of operating at the desired frequency of the particular application.

Referring now to FIG. 8, the particular operation of certain elements disclosed in FIG. 6 will be explained. Beam switching tubes offer a convenient method of obtaining the selectable gross delays required for the operation of certain elements. The desired delay increments indicate the use of a five kilocycle two phase switching frequency for these beam switching tubes. However, accurate timing is necessary in the generation of the different gate pulses, which may not be obtained from the five kilocycle operation of the beam switching tubes since the pulses produced by the beam switching tubes are irregular in their timing due to the jitter inherent in the beam switching tube operation. In the instant invention, the pulses produced by the beam switching tube are used to obtain a coarse determination of a length of a tracking pulse; then the leading and trailing edges of the pulse are resynchronized with the one megacycle crystal clock source. The waveform RR of FIG. 8 represents a typical pulse derived from one of the outputs of the beam switching tubes. This pulse is differentiated in one of the selectors 616 or 617 to produce fairly narrow pulses at the leading and trailing edges thereof, as represented by the waveform QQ. The positive pulse 811 produced by the leading edge of the beam switching tube pulse is then applied by the selector to a flip-flop, such as 618, to place the flip-flop in its set state. The synchronized 100 kilocycle pulses derived from the counting unit by line 61 are used to reset the flip-flop 618 and thus synchronize the trailing edge of a pulse from the flip-flop with the count existing in the counter unit 522, as illustrated in waveform OO. It is the synchronized trailing edge of the pulse from the flip-flop 618 which is used to apply the set signal to the tracking gate flip-flop 621, thus both edges of the gate pulse are closely synchronized with the count existing in the counter, as illustrated by waveform NN. Thus, the invention takes advantage of the simplicity of circuitry inherent in the use of commercial decimal counting units and beam switching tubes while maintaining the synchronization of the beam switching tube pulses with the counter.

While this invention has been disclosed in relation to a particular form of information derived from a passive underwater detection device, it should be obvious that the system will perform equally well upon any signal contained in a cycle having a constant repetition rate which it is desired to track automatically. In some circumstances, such as the tracking of signals with high signal-to-noise ratios and in instances where the noise is of Gaussian distribution, a proportional type tracker will provide better operation. This circuit may be easily modified to produce a proportional type operation. Instead of just the two gates 512 and 513 to provide either a fixed movement right or left, the error signal is allowed a wider range and is applied to a bank of gates, each gate responds to a different level of error signal. Each of the gates would respond to a different gate pulse to add or drop one pulse for each gate responding to that amplitude of gating pulse, and the gate will thereby be moved right or left by the relative magnitude of the error signal.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A target signal tracker for tracking a repeating target signal, said target signal occurring once during a fixed cycle interval comprising gate means for generating a gating pulse for each repetition of said target signal, error detecting means for determining the time displacement of the said target signal with relation to the center of said gating pulse, said error detecting means generating a first signal level when the target signal is to one side of said gating pulse and a second signal level when to the other side, and gate positioning means connected to said error detecting means for changing the position of said gating pulse by a fixed time step in response to said signal level for each repetition of said target signal, whereby the center of the gating pulse is maintained in substantial coincidence with said target signal.

2. A target signal tracker of claim 1 in which said gate positioning means comprises a source of high frequency pulses, a digital counting unit connected to said source of high frequency pulses to count the number of pulses therefrom, said digital counting unit having a count capacity time duration normally equal to the time duration of the said cycle interval, and means responsive to the said signal levels for changing the number of pulses from a normal sequence of high frequency pulses from said source, and in which said gate means is connected to said digital counter, whereby a gating pulse is generated at a particular point in said total count whereby the gating pulse may be advanced or retarded in time with relation to the beginning of said cycle interval.

3. A target signal tracker for tracking a target in a particular cycle of fixed repetition rate comprising gating means for generating a gating pulse during a portion of each cycle, comparing means for comparing the time position of said target signal with the time position of said gating pulse and producing error signals in relation thereto, gate positioning means connected to said comparing means for changing the position of a subsequent gating pulse in response to the error signals from said comparing means, whereby said gate means produces a gating pulse for each cycle, said gating pulse being moved by a fixed amount toward the position of the target signal determined by the preceding cycle.

4. A gate pulse positioner comprising pulse counter means of fixed count capacity, a source of regularly occuring high frequency digital pulses to be counted, a normally open first gate connected between said source and said counter, means for providing a second source of high frequency digital pulses 180° out of phase with said first source, a normally closed second gate connected to said second source, both of said gates being connected to said counter to provide pulses thereto when open, gate pulse producing means connected to said counter to be actuated upon a certain count being attained therein, signal means for producing a signal in accordance with a desired position of said gates, said signal means being connected to said gates for closing said first gate or opening said second gate for a fixed time interval selectively in accordance with said signal from said signal means, whereby a fixed number of pulses are added or removed during said interval to respectively advance or retard the time position of the gate pulse.

5. In a circuit having a signal source providing a signal cycle of fixed time duration, a gate positioner comprising a gating signal source providing a gating signal normally of a duration equal to said signal cycles, said gating signal source providing a gate signal at a fixed portion of said gating cycle, said gate positioner selectively changing the time duration of said gating cycle, whereby the position of said gate signal in relation to said signal cycle is selectively moved, said gating signal source comprising a pulse counter, a source of regularly spaced pulses to be counted connected to said counter, and gating means for changing the number of pulses of said source of regularly spaced pulses.

6. The positioner of claim 5 in which the number of pulses from said source is changed for each cycle of operation.

7. A target signal tracker for use in tracking a target signal in a varying signal-to-noise ratio background, said target signal appearing once during each cycle interval with constant repetition rate comprising an input source for introducing said target signal and first gating means for passing only a fixed time portion of the cycle interval containing said target signal, standardizing means connected to said first gating means for standardizing the amplitude of the cycle portion passed by said first gating means, error detecting means for determining the position of said target signal with relation to the center of said cycle portion, said error detecting means generating a first error signal when the target signal is before said center and a second error signal when said target signal is after said center, gate positioning means for determining the subsequent time of occurrence of said cycle portion with relation to said signal, said positioning means being connected to and responsive to first and second error signals from said error detecting means to delay or advance respectively the subsequent time of occurrence, said gate positioning means being also connected to said first gating means to pass a fixed time portion of the subsequent cycle according to said subsequent time of occurrence determined by said gate positioning means, whereby said cycle portion is moved to coincide with said target signal.

8. The target signal tracker of claim 7 in which said gate positioning means comprises a pulse counter, a source of regularly spaced pulses to be counted connected to said counter, and gating means for adding pulses to or removing pulses from said source of regularly spaced pulses selectively in accordance with the reception of said first or said second signal respectively from said error detecting means.

9. A gate pulse timing circuit comprising a source of high frequency pulses, a digital counter connected to said source to count said high frequency pulses, said counter having a plurality of counter stages connected in series, each stage being responsive to a maximum count existing in a preceding stage, low frequency counting means connected to one of said counting stages and responsive to a maximum count existing therein, said low frequency counting means having a plurality of outputs for the counts existing therein, bistable means having a set and a reset state, said bistable means connected to one of said outputs to be set thereby, said bistable means also connected to said high frequency source to be reset thereby, and gate pulse producing means connected to be operated by the resetting of said bistable means, whereby the timing of a gate pulse is determined by said low frequency counter outputs and is subsequently synchronized with pulses from said high frequency source.

10. A gate pulse timing circuit comprising a source of high frequency pulses, high frequency counting means connected to said source to count the pulses therefrom, said high frequency counting means having a low frequency pulse output, low frequency counting means connected to said low frequency output for counting pulses therefrom, switching means connected to receive an output signal from said low frequency counting means and also connected to said high frequency source for producing a signal pulse upon receiving a high frequency pulse following the reception of an output signal from said low frequency counting means, whereby said signal pulse is synchronized with a pulse from said high frequency source.

11. The gate pulse timing circuit of claim 10 in which said high frequency counting means comprises a multi-stage digital counter.

12. The gate pulse timing circuit in claim 11 in which said low frequency counting means comprises a beam switching tube.

13. The gate pulse timing circuit of claim 12 in which said beam switching tube is connected to count pulses from a low frequency output from said multi-stage digital counter.

14. The gate pulse timing circuit of claim 13 in which said switching means comprises a first bistable circuit having a set state and a reset state, said output from said low frequency counter being connected to place said first bistable circuit in the set state, said high frequency source being connected to place said first bistable means in the reset state, and a gate pulse producing means being connected to said first bistable circuit to be actuated by the reset thereof.

15. A target signal tracker for tracking a target signal occurring once during a fixed cycle interval comprising gate means for generating a gating pulse for each repetition of said cycle, error detecting means for determining the time displacement of the said target signal with relation to the center of said gating pulse, said error detecting means being operative to produce an error signal representative of the direction and amount of the displacement, and gate positioning means connected to said error detecting means for changing the time of occurrence of said gating pulse in a direction and amount in response to said error signal for each repetition of said target signal, whereby the center of the gating pulse is maintained in substantial coincidence with said target signal, said gate positioning means comprising second gate means responsive to the level of said error signal for changing the position of a subsequent gating pulse by predetermined fixed amounts relative to the prior target signal position, said second gate means comprises a plurality of gates for moving the gating pulse a plurality of different fixed time steps selectively in either direction.

References Cited by the Examiner
UNITED STATES PATENTS 2,446,244  8/48  Richmond _____ 343—17.1
2,709,804  5/55  Chance et al. _____ 343—7.4

CHESTER L. JUSTUS, *Primary Examiner.*